(12) United States Patent
Stancato et al.

(10) Patent No.: US 9,499,120 B1
(45) Date of Patent: Nov. 22, 2016

(54) ACTIVE BOLSTER AND BOLSTER VENT

(71) Applicant: Ford Global Technologies, LLC, Dearborn, MI (US)

(72) Inventors: Cortney Stancato, Novi, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/918,629

(22) Filed: Oct. 21, 2015

(51) Int. Cl.
*B60R 21/045* (2006.01)
*B60R 21/239* (2006.01)
*B60R 21/2342* (2011.01)
*B60R 21/00* (2006.01)
*B60R 21/04* (2006.01)

(52) U.S. Cl.
CPC ........... *B60R 21/239* (2013.01); *B60R 21/045* (2013.01); *B60R 21/2342* (2013.01); *B60R 2021/0051* (2013.01); *B60R 2021/0407* (2013.01)

(58) Field of Classification Search
CPC ................... B60R 21/239; B60R 2021/0407; B60R 21/045
See application file for complete search history.

(56) References Cited

U.S. PATENT DOCUMENTS

| | | | | |
|---|---|---|---|---|
| 3,387,765 A | * | 6/1968 | Davis | B65D 51/1611 137/849 |
| 5,007,662 A | * | 4/1991 | Abramczyk | B60R 21/239 280/739 |
| 5,704,639 A | * | 1/1998 | Cundill | B60R 21/239 280/739 |
| 5,738,368 A | | 4/1998 | Hammond et al. | |
| 5,803,121 A | * | 9/1998 | Estes | B60R 21/239 137/849 |
| 6,017,057 A | * | 1/2000 | O'Docherty | B60R 21/239 280/737 |
| 6,726,242 B2 | * | 4/2004 | Moon | B60R 21/239 280/739 |
| 7,740,274 B2 | * | 6/2010 | Manssart | B60R 21/239 280/739 |
| 7,766,384 B2 | * | 8/2010 | Tavares Da Silva Vinhas | B60R 21/239 280/739 |
| 7,770,925 B2 | * | 8/2010 | Seymour | B60R 21/201 280/728.2 |
| 7,828,325 B2 | * | 11/2010 | Pittiglio | B60R 21/239 137/843 |
| 8,328,233 B2 | * | 12/2012 | Kalisz | B60R 21/02 280/730.1 |
| 8,454,054 B1 | * | 6/2013 | Raines | B60R 21/239 280/730.1 |
| 8,720,943 B1 | * | 5/2014 | Mazzocchi | B60R 21/04 280/730.1 |
| 9,156,423 B1 | * | 10/2015 | Aselage | B60R 21/239 |
| 2004/0094943 A1 | | 5/2004 | Fukawatase et al. | |
| 2004/0256842 A1 | | 12/2004 | Breed | |
| 2005/0110258 A1 | | 5/2005 | Fuks | |
| 2012/0248742 A1 | * | 10/2012 | Kalisz | B60R 21/02 280/728.2 |
| 2013/0093167 A1 | | 4/2013 | Volkmann et al. | |
| 2014/0151987 A1 | * | 6/2014 | Mazzocchi | B60R 21/04 280/739 |
| 2015/0054268 A1 | | 2/2015 | Raines et al. | |

\* cited by examiner

*Primary Examiner* — Ruth Ilan
(74) *Attorney, Agent, or Firm* — Frank A. MacKenzie; Bejin Bieneman PLC

(57) ABSTRACT

An active bolster for an automotive vehicle includes a bladder that inflates an interior trim area of the vehicle to provide a cushion to an occupant during an impact. The bladder has a first wall and a second wall cooperatively defining an interior cavity. The bladder has a two stage vent for venting inflation gas supplied into the cavity during an impact event. The vent has a first aperture defining a first predetermined flow area when a pressure difference across the vent is substantially zero. A bendable member defines at least in part the first aperture. A weakened seam joins the bendable member to an adjacent feature of the bladder. When there is a predetermined pressure difference across the vent, the weakened seam is ruptured and the bendable member deflects to a second position defining a second flow area greater than the first flow area.

14 Claims, 5 Drawing Sheets

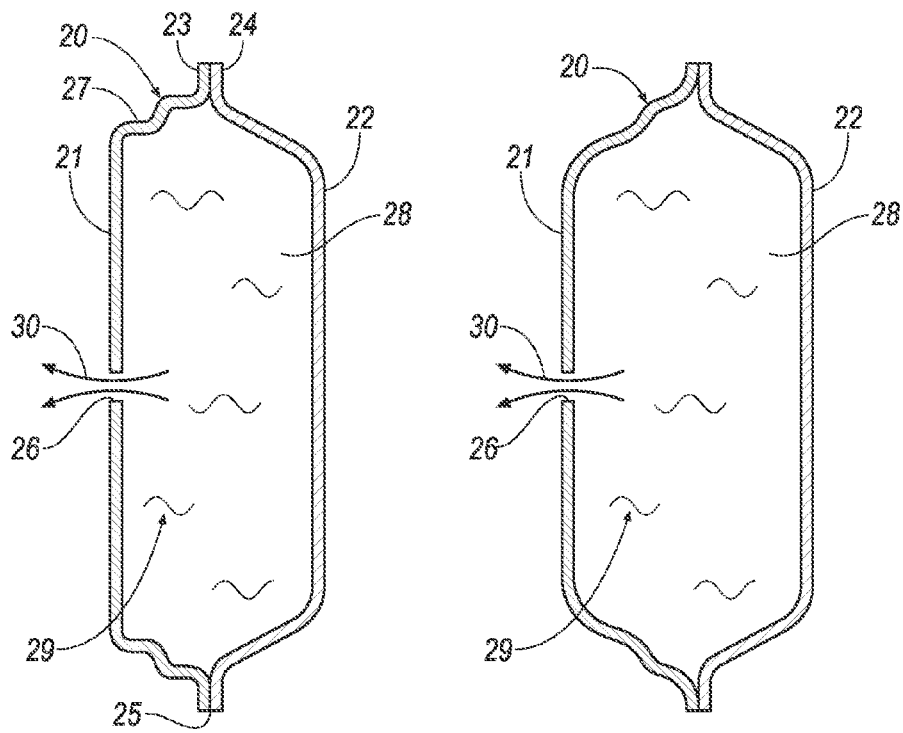
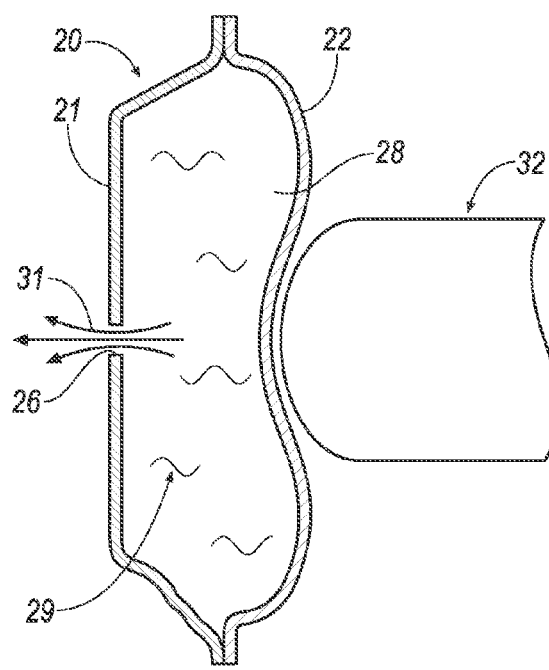
FIG. 1
FIG. 2
FIG. 3

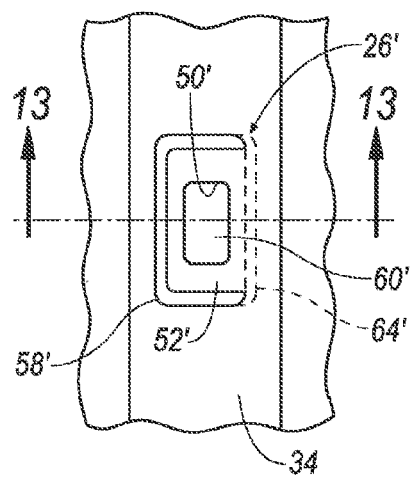
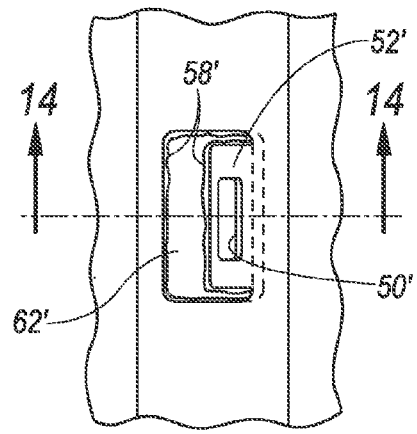
FIG. 11            FIG. 12
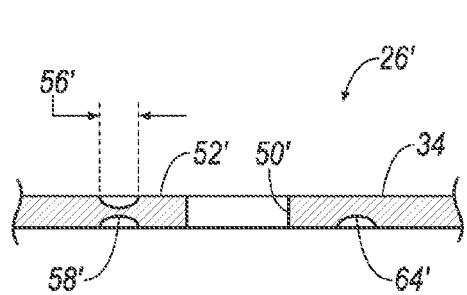
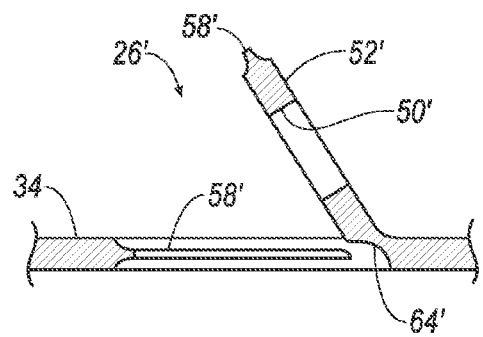
FIG. 13            FIG. 14
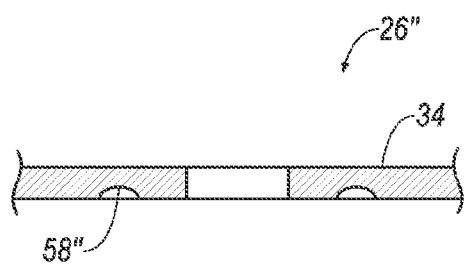
FIG. 15

ACTIVE BOLSTER AND BOLSTER VENT

BACKGROUND

An active bolster is a vehicle occupant protection device with a gas-inflatable bladder to absorb impacts and reduce trauma to occupants during an impact. As opposed to deploying air bag cushions through various openings, active bolsters use an interior trim surface as part of the bolster which expands at the beginning of an impact event and absorbs the passenger impact and dissipates energy through the action of an inflation gas.

In a typical structure, an active bolster includes a front wall or panel that faces a vehicle occupant and is attached to a rear wall or panel along a sealed peripheral seam. The walls are typically made of molded plastic with an accordion section that straightens during deployment, thereby providing an inflatable bladder. The peripheral seam is formed by hot welding, for example.

It is desirable to vent the inflatable bladder at all times to maintain it at substantially atmospheric pressure during non-impact conditions. Otherwise, noticeable deformation of the interior trim component incorporating the active bolster may occur during temperature extremes since the wall materials are relatively flexible. While venting is needed, it is desirable to avoid the use of expensive, complicated exhaust valves. A common solution has been to provide a continuously open vent of a fixed flow area. The vent flow area must be large enough to provide sufficient exhaust of gas to enable the desired cushioning effect during an impact.

BRIEF DESCRIPTION OF THE DRAWINGS

FIG. 1 is a cross section view of an example of a bolster bladder during an initial phase of inflation.

FIG. 2 is a cross section view of an example of a bladder near maximum inflation.

FIG. 3 is a cross section view of an example of an inflated bladder being impacted by an occupant.

FIG. 11 is an enlarged plan view of an embodiment of the vent illustrated in FIG. 10 and circled by loop 11.

FIG. 12 is a plan view of the vent illustrated in FIG. 11 with the vent in a ruptured exhaust position with a bendable member deflected into a high flow position.

FIG. 13 is a cross section view of the vent illustrated in FIG. 11 in the direction of arrows 13.

FIG. 14 is a cross section view of the vent illustrated in FIG. 12 in the direction of arrows 14.

FIG. 15 is a cross section view of an alternative embodiment of the vent illustrated in FIG. 13.

DETAILED DESCRIPTION

Figure 4:
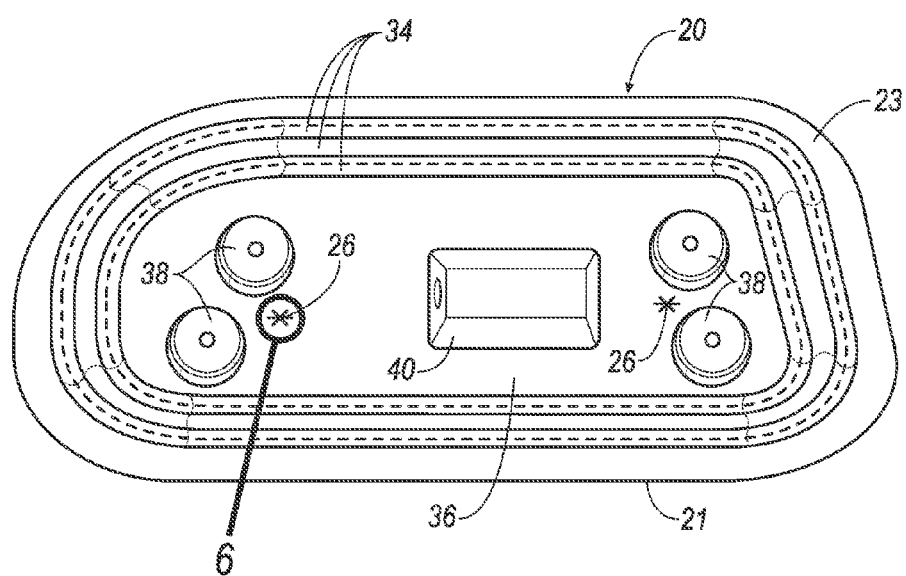
FIG. 4 is a rear perspective view of an example of a rear wall of an inflatable bladder assembly of an active bolster with one embodiment of the active vent.

Relative orientations and directions (by way of example, upward, front and rear) are set forth in this description not as limitations, but for the convenience of the reader in picturing at least one embodiment of the structures described.

FIG. 1 shows an inflatable bladder 20 for an active bolster comprising a rear wall or panel 21 on a bearing side and a front wall or panel 22 on a deployment side. Such bolsters are described in U.S. Pat. No. 8,720,943, issued on May 13, 2014, which is incorporated herein by reference. Walls 21 and 22 each have a peripheral flange, 23 and 24 respectively. Flanges 23 and 24 are bonded together, for example by hot welding, to form a sealed peripheral seam 25. Rear wall 21 has a variable base vent 26 and an accordion section 27 that straightens during inflation as shown in FIG. 1. An internal cavity 28 is defined by walls 21 and 22. An inflation gas 29 released by an inflator (not shown) into cavity 28 expands bladder 20, with a first flow 30 of gas 29 venting through vent 26.

FIG. 3 shows an occupant's knee 32 impacting front wall 22 on the deployment side, causing wall 22 to deform. The impact tends to increase the pressure of gas 29 in the bladder, resulting in a second flow of gas 31 through base vent 26 that is greater than the first flow 32. Vent 26 as explained in more detail below has a first fixed cross-sectional configuration, which provides a first flow area, and a second cross sectional configuration which provides a second flow area larger than the first flow area.

FIG. 4 is a rear view of the inflatable bladder 20 for the active bolster incorporating a first embodiment of an active vent 26. Rear wall 21 includes a plurality of pleated baffles or accordion folds 34, disposed between rear peripheral flange 23 and a central region 36 of rear wall 21. Accordion folds 34 accommodate the expansion of bladder 20 during inflation. A plurality of bosses 38 is disposed on central region 36. Bosses 38 are used to mount rear wall 21 to a reaction surface. One embodiment of vent holes 26 are of an asterisk-shaped pattern cut through rear wall 21 and are used for venting internal cavity 29 prior to and during inflation. Central region 36 also includes an inflator recess 40 for receiving a gas-generating inflator.

Figure 5:
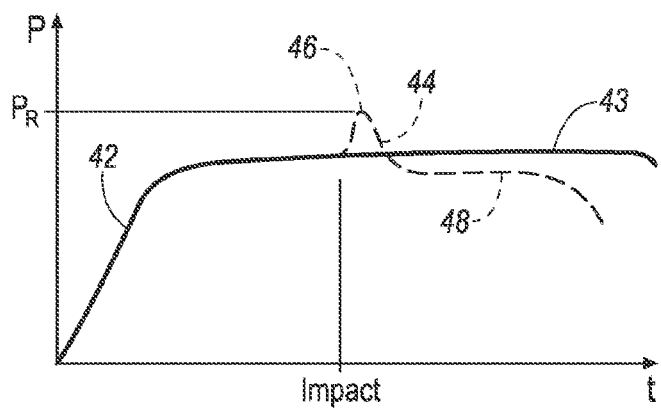
FIG. 5 is an exemplary graph comparing bladder pressure versus time for a passive vent mode and an active vent mode.

FIG. 5 is a plot of bolster pressure as a function of time with time t being plotted on the horizontal axis, and pressure P being plotted on the vertical axis. The solid line 42 illustrates the pressure when the bolster is inflated without any impingement on the bolster. A first pressure plateau 43 is established when a rate of gas generation equals a rate of venting. The broken line 44 shows how the pressure changes with time responsive to an impact at a time labeled Impact by an impinging object such as a human knee 32. Line 44 illustrates a rapid increase in pressure to a peak 46 on impact, peak 46 associated with a predetermined rupture pressure $P_R$ for vent 26. Line 44 subsequently illustrates a drop in pressure to a second plateau 48 after rupture pressure $P_R$ of vent 26 has been reached. The pressure inside bladder 20 then decreases to atmospheric pressure. The shape of lines 42 and 44 for any vent will depend on the relative area sizes associated with the two venting modes and the vent's rupture pressure. For example, if the area of the second venting mode's area is large enough, there may not be any significant second plateau 48, with the pressure dropping quickly to zero. The use of two stage active vent 26 enables a faster initial pressure increase with the vent at a first stage characterized by a low flow area, while still allowing for cushioning of an impinging body part such as a knee with the vent being forced into a second stage characterized by an increase in flow area. Thus, a fast filling of bladder 20 is obtained without requiring a larger, more expensive, inflator capacity and without compromising the resulting cushioning effect of bladder 20. The two stage vent 26 enables bladder 20 to more quickly reach a plateau suitable for effectively resisting the forward movement of an impinging object in a first mode with a fixed vent area, and to suitably cushion the impinging object by increasing the vent area to permit a more rapid exit of gas from bladder 20.

Figures 6, 7:
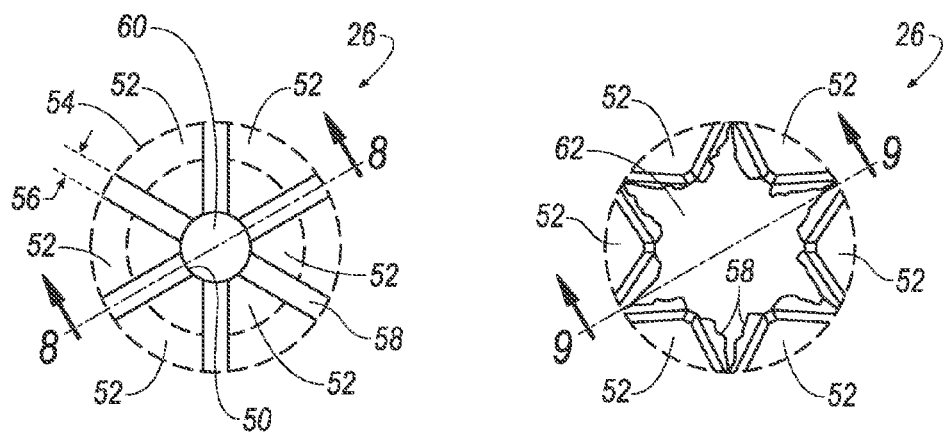
FIG. 6 is an enlarged plan view of an example of a vent illustrated in FIG. 4 and circled by loop 6.
FIG. 7 is a plan view of the vent illustrated in FIG. 6 with the vent in a ruptured exhaust position with bendable members deflected into high flow positions.

The vent of FIG. 4 is shown in more detail in FIG. 6. Variable vent 26 is formed in the central region 36 of the rear wall 21 of the inflatable bladder 20 on the bearing side (i.e., the side that bears against the fixed structure of the vehicle such as the frame of an instrument panel, glove box door, or vehicle door). The embodiment of variable vent 26 shown in FIG. 6 includes a passive opening 50 that continuously vents internal cavity 28 of the inflatable bladder 20 to the interior of the passenger cabin of the vehicle. Variable vent 26 further includes a plurality of substantially planar, bendable members 52 (i.e., flaps) extending from an outer periphery 54 of vent 26 toward an open center defining opening 12. A gap 56 between each adjacent bendable member 52 is defined by a groove or channel, or as in FIG. 8, opposing channels. The channel or channels, by reducing the local material thickness of wall 21, additionally define a connecting membrane 58 joining adjacent bendable members 52. Opening 50 defines first flow area 60 of vent 26. A second flow area 62 is greater than the first flow area 60 and is defined in part by the expanded gaps between bendable members 52 after rupture of the membranes 58. The difference in flow areas is illustrated by comparing the first flow area 60 presented by opening 50 in FIG. 6 and the second flow area 62 between the bendable members 52 in FIG. 7.

Figures 8, 9:
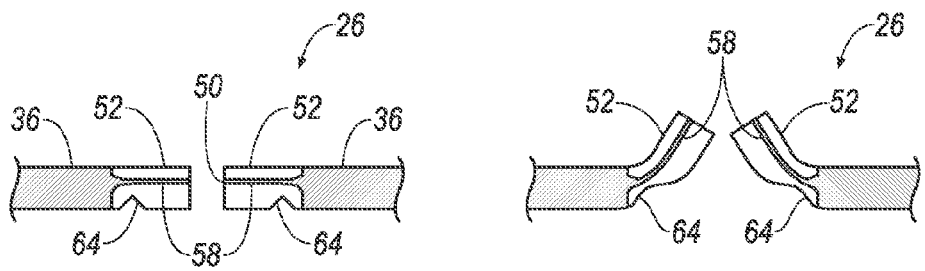
FIG. 8 is a cross section view of the vent illustrated in FIG. 6 in the direction of arrows 8.
FIG. 9 is a cross section view of the vent illustrated in FIG. 7 in the direction of arrows 9.

Under normal conditions (i.e., with zero pressure difference across the vent), each member or flap 52 lies substantially flat and is connected by membranes 58 as shown in FIG. 6 and FIG. 8. In the unbent condition, the flow through vent 26 depends on the area 60 of opening 50 in the direction of flow. When the pressure difference across vent 26 exceeds a predetermined value, such value depending on both the bending strength of bendable members 52 and the strength of membranes 58, members 58 are deflected in the direction of flow, or upward as shown in FIG. 7. The larger second flow area 62 shown FIG. 7 and in the section of FIG. 9 is produced when the bendable members are deflected upward, allowing a more rapid exhaustion of gas 29 through vent 26 when the pressure difference across vent 26 is greater than or equal to a predetermined pressure difference sufficient to rupture membranes 58. Each member 52 is made bendable by providing a local reduction in the thickness of each flap. A notch 64 is one example of a means of providing a bendable hinge on each flap as shown in FIG. 8 and FIG. 9. Alternatively, each flap 52 may be of reduced thickness across its entire length to facilitate bending. Once membranes 58 have ruptured, the flow area will increase with the amount of deflection of members 52. Accordingly, second flow 62 area will vary with the pressure difference across vent 26.

Figure 10:
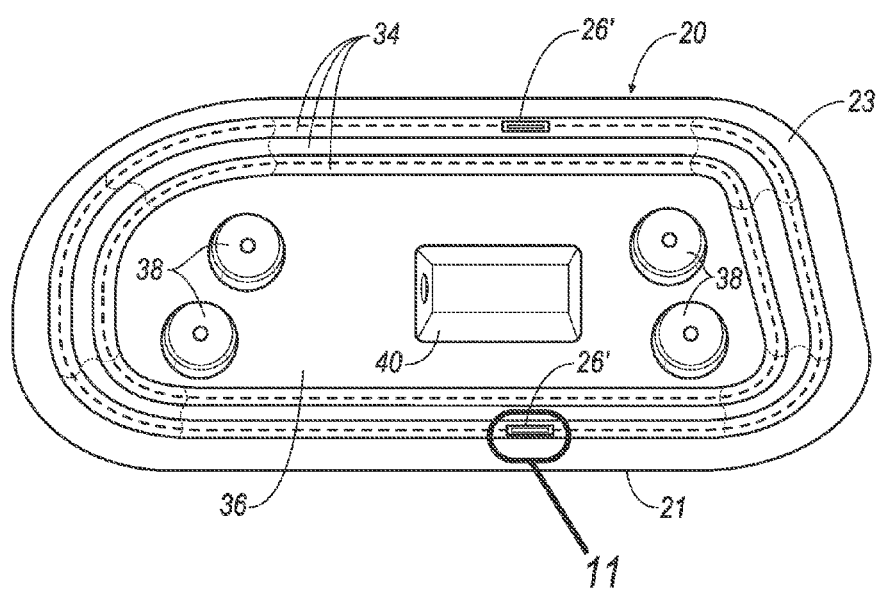
FIG. 10 is a rear perspective view of an example of a rear wall of an inflatable bladder assembly of an active bolster with an alternative embodiment of the vent.

FIG. 10 is a rear view of an inflatable bladder 20 for an active bolster incorporating an alternative embodiment of an active two stage vent 26'. Folds 34 are shown as incorporating two active vents 26', although a different number of vents and different vent placements anywhere on rear wall 21 can be employed.

The pressure versus time plot of FIG. 5 is applicable to vent 26' as well as to vent 26. Vents 26' can be configured, through the choice of such variables as the sizes of first flow area 60', second flow area 62' and the rupture strength of membrane 58' and the resistance to bending or deflection of member 52', to provide the same performance as vents 26.

Vent 26' is shown in more detail in FIGS. 11 through 14. The embodiment of vent 26' shown in FIG. 11 includes a passive opening 50' that provides a first flow area 60' and continuously vents internal cavity 28 of the inflatable bladder 20 to the interior of the passenger cabin of the vehicle. Variable vent 26' further includes a substantially planar bendable member 52' (i.e., a flap) that can be bendable across its entire area, or hinged as shown in FIGS. 11-14. Vent 26' is shown in the illustrated embodiment as rectangular in shape for packaging reasons. Vent 26' can take any shape that fits the available space, and that can provide the desired resultant gas flow. In the exemplary embodiment, vent 26' extends from a first hinged side to an opposing second side distinguished from the rest of bladder 20 by a gap 56' closed by a connecting membrane 58'. A hinge 64' in the form of a notch or groove in rear wall 21 allows member 52' to bend or pivot relative to rear wall 21 once membrane 58' is broken. Gap 56' and membrane 58' wrap around to define the ends of vent member 52'. Connecting membrane 58' may be formed by providing a reduced cross sectional thickness in the gap between the bendable members 56'. In FIG. 13 and FIG. 14, gap 56' and membrane 58' are both formed by two opposing channels removing all but a thin section of material therebetween. The thin section is membrane 58'. One possible alternative configuration for a membrane 58" is shown on vent 26" in FIG. 15, with a single relatively deep channel removing all but a thin section of material which remains as membrane 58'''. A second flow area 62' greater than first flow area 60' is defined by the effective combined area of passive opening 50' and the distance between the open side of the planar member and gap where planar member 52' was formerly attached. The difference in flow areas is best appreciated by comparing a first flow area 60' presented by opening 50 in FIG. 11 and FIG. 13 with a second flow area 62' presented by both opening 50 and the space opened by the deflection of member 52' in FIG. 12 and FIG. 14.

Under normal conditions (i.e., with zero pressure difference across the vent), member 52' lies substantially flat and connected to wall 21' by membrane 58' as shown in FIG. 11 and FIG. 13. In the unbent condition, the flow through vent 26' depends on the area 60' of opening 50' in the direction of flow. When the pressure difference across vent 26' exceeds a predetermined value $P_R$, such value depending on both the bending strength of bendable member 52' and the strength of membrane 58', member 52' is deflected in the direction of flow, or upward as shown in FIG. 12 and FIG. 14, with membrane 58' rupturing or tearing. Portions of torn membrane 58' remain on each of fold 34 and member 52'. The larger flow area 62' shown FIG. 12 and in the section of FIG. 14 is produced when the bendable member 52' is deflected upward, allowing a more rapid exhaustion of gas 29 both past member 52' and through opening 50' when the pressure difference across vent 26' is greater than or equal to a predetermined pressure difference sufficient to rupture membrane 58'. Member 52' is made bendable by providing a local reduction in thickness at hinge 64'. A notch is one example of a means of providing a bendable hinge 64' on each flap 52' as shown in FIG. 13 and FIG. 14. As an alternative to hinge 64', member 52' may be of reduced thickness across its entire area to facilitate bending. Once membrane 58' has ruptured, the flow area will increase with the amount of deflection of member 52'. Accordingly, the flow area will vary with the pressure difference across vent 26'.

The localized thinning of the bladder characterized as the membranes is just one means of providing a weakened seam joining the bendable members 26 and 26' to each other and to the bladder. Other means could include perforations or near perforations. If perforations are used, their flow area would be taken into consideration in selecting the sizes of the aperture and the bendable members and other features.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. An active bolster comprising:
   a bladder having a first side and a second side cooperatively defining an internal cavity;
   a two stage vent formed integrally with the bladder with the vent including
     a first aperture defining a first flow area of a first size, and
     a bendable member connected to the bladder on a connection side of the bendable member and the bendable member in a first stage position defining at least in part the first aperture and the bendable member in a second stage position displaced from the first stage position and defining a second flow area greater than the first flow area, and
     a weakened seam disposed between and joining the bendable member and an adjacent feature of the bladder in the first stage position and tending to maintain the bendable member in the first stage position when a pressure difference across the vent is substantially zero and the weakened seam of a sufficient strength to provide a predetermined rupture pressure greater than zero.

2. The bolster of claim 1 wherein the vent comprises a plurality of substantially planar, bendable members extending from an outer periphery of the vent toward an open center within the vent and the weakened seam connecting each adjacent bendable member and the bendable members and the weakened seams cooperatively defining the first aperture.

3. The bolster of claim 2 wherein the vent is integrated into the first side, wherein the first side adjacent the periphery of the vent has a first thickness, and wherein the bendable members each have a respective thickness less than the first thickness.

4. The bolster of claim 2 wherein one or more of the bendable members includes an undercut notch to act as a hinge.

5. The bolster of claim 2 wherein the weakened seam is provided by a membrane formed by a groove in the bladder.

6. The bolster of claim 1 wherein the bendable member is single and unitary and is substantially planar and extends from a first portion of a periphery of the vent and the bendable member entirely defines the first aperture and the weakened seam is disposed between a remaining periphery of the vent and a surrounding bolster portion.

7. The bolster of claim 6 wherein the vent is formed in an accordion fold of the bladder.

8. The bolster of claim 7 wherein there are a plurality of vents are formed in the bladder.

9. The bolster of claim 7 wherein the vent is rectangular.

10. The bolster of claim 9 wherein the first aperture is rectangular.

11. The bolster of claim 6 wherein the weakened seam is provided by a membrane formed by a groove in the bladder.

12. The bolster of claim 1 wherein a gas source is coupled to the bladder for supplying inflation gas into the internal cavity during a deployment to expand the bladder.

13. A method of actively venting an active bolster in a vehicle, wherein the bolster includes a bladder having a first side and a second side defining an internal cavity for receiving inflation gas from a gas source during an impact event of the vehicle, the method comprising the steps of: configuring a vent in the bladder to provide a first predetermined flow area greater than zero when a pressure difference across the vent is substantially zero; further configuring the vent to include a weakened seam which ruptures at a predetermined pressure difference and resultantly establishes a second flow area greater than the first flow area; initiating a delivery of the inflation gas into the bladder in response to the impact event, wherein the inflation gas flows out of the vent through the first predetermined flow area during the initial delivery of inflation gas to inflate the bladder; and venting the inflation gas out of the vent through the second flow area when a pressure difference across the vent rises to the predetermined pressure difference.

14. A bladder for an active bolster comprising: a first wall; and a second wall joined to the front wall defining an inflatable cavity and having a variable vent for venting inflation gas supplied into the cavity during an impact, the vent having a first predetermined flow area when a pressure difference across the vent is substantially zero and a greater flow area when there is at least a predetermined pressure difference across the vent and a weakened seam defining a part of the vent is ruptured by the pressure difference.

* * * * *